(12) United States Patent
Zhou

(10) Patent No.: US 7,809,282 B2
(45) Date of Patent: Oct. 5, 2010

(54) DISPERSION COMPENSATING CIRCUITS FOR OPTICAL TRANSMISSION SYSTEM

(75) Inventor: Shutong Zhou, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 732 days.

(21) Appl. No.: 11/433,278

(22) Filed: May 12, 2006

(65) Prior Publication Data

US 2007/0264027 A1    Nov. 15, 2007

(51) Int. Cl.
*H04B 10/04* (2006.01)
*H04B 10/12* (2006.01)
*H01S 3/00* (2006.01)

(52) U.S. Cl. ............... 398/193; 398/194; 372/38.08
(58) Field of Classification Search ......... 398/192–194; 372/38.08

See application file for complete search history.

(56) References Cited

U.S. PATENT DOCUMENTS

| | | | |
|---|---|---|---|
| 5,115,440 A * | 5/1992 | Gysel et al. | ............ 372/38.08 |
| 5,146,192 A | 9/1992 | Kondo et al. | |
| 5,302,922 A | 4/1994 | Heidemann et al. | |
| 5,321,710 A * | 6/1994 | Cornish et al. | ................ 372/26 |
| 5,378,937 A * | 1/1995 | Heidemann et al. | ......... 327/306 |
| 5,930,696 A | 7/1999 | Tzuang et al. | |
| 6,107,877 A | 8/2000 | Miguelez et al. | |
| 6,133,790 A | 10/2000 | Zhou | |
| 6,288,814 B1 * | 9/2001 | Blauvelt | ................... 398/193 |
| 6,519,374 B1 * | 2/2003 | Stook et al. | .................... 385/2 |
| 6,549,316 B2 | 4/2003 | Blauvelt | |
| 6,577,177 B2 | 6/2003 | Zhou et al. | |
| 6,587,243 B1 | 7/2003 | Zhou | |
| 6,865,199 B2 | 3/2005 | Miguelez et al. | |
| 6,985,020 B2 | 1/2006 | Zhou | |
| 7,057,474 B2 | 6/2006 | Miller | |
| 7,606,502 B2 | 10/2009 | Zhou | |
| 2002/0063930 A1 | 5/2002 | Blauvelt | |
| 2004/0056720 A1 | 3/2004 | Jansen et al. | |
| 2007/0030087 A1 * | 2/2007 | Perry et al. | ............. 331/177 V |
| 2007/0264027 A1 | 11/2007 | Zhou | |
| 2008/0292315 A1 | 11/2008 | Zhou et al. | |
| 2009/0245309 A1 | 10/2009 | Khalouf et al. | |

OTHER PUBLICATIONS

PCT International Search Report & Written Opinion, RE: Application #PCT/US2009/037909 May 20, 2009.

* cited by examiner

*Primary Examiner*—Nathan M Curs
(74) *Attorney, Agent, or Firm*—Larry T. Cullen

(57) ABSTRACT

Improved dispersion compensating circuits for optical transmission systems are disclosed. According to the improved method, there is provided a compensation circuit comprising a varactor diode network. The network is preferably inserted between a source of laser modulating signal and the laser. A low pass filter constructs the network. The network preferably includes an inductance and a combined circuit, which includes varactors. The network preferably provides an amplitude dependent delay of the modulating signal applied to the laser. In a first embodiment, a fixed capacitor is in series with a varactor and connected to a DC bias through inductor. In a second embodiment, second varactor is in series with varactor instead with an opposite polarity of a fixed capacitor as used in the first embodiment. In a third embodiment, two varactors 301 and 302 are used in place of the fixed capacitor in parallel.

12 Claims, 3 Drawing Sheets

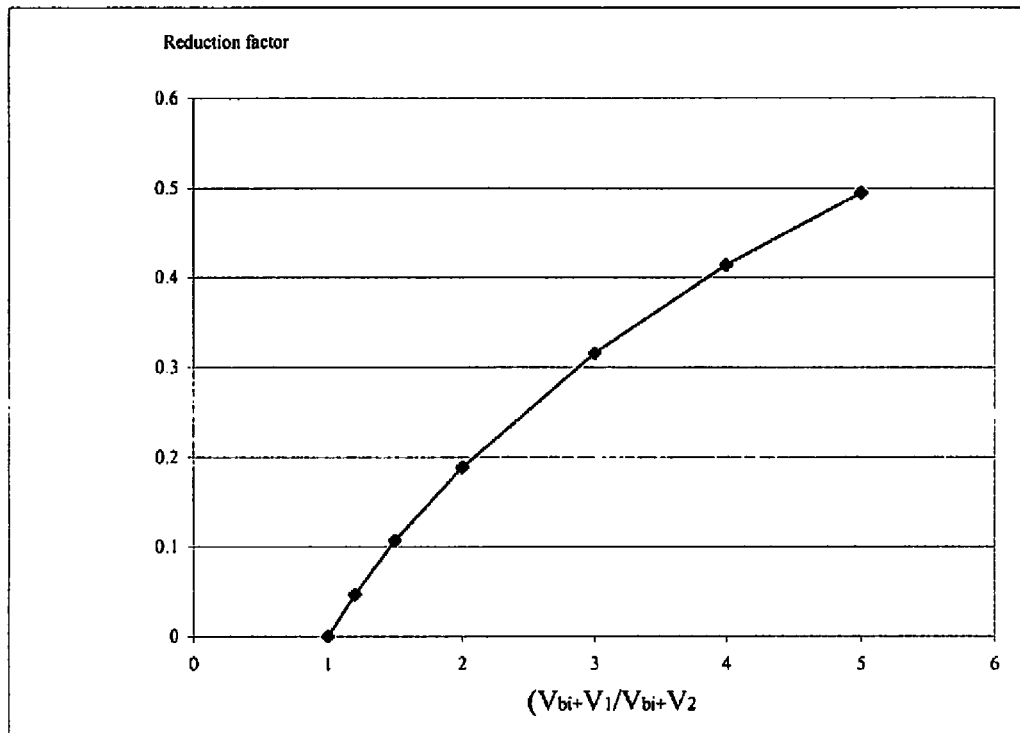
Fig. 3 Reduction factor versus $(V_{bi} + V_1) / (V_{bi} + V_2)$ for $C_2$ using single varactor.
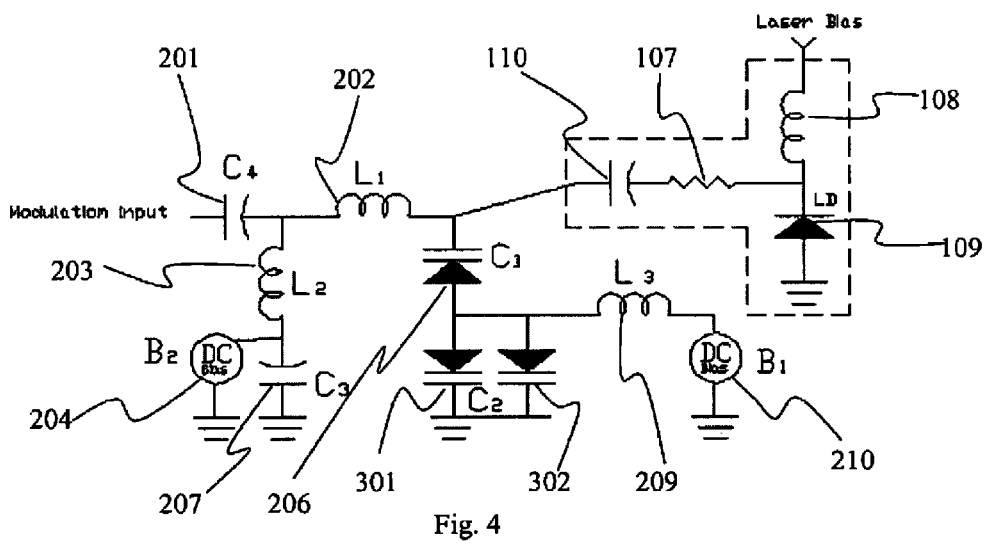
Fig. 4

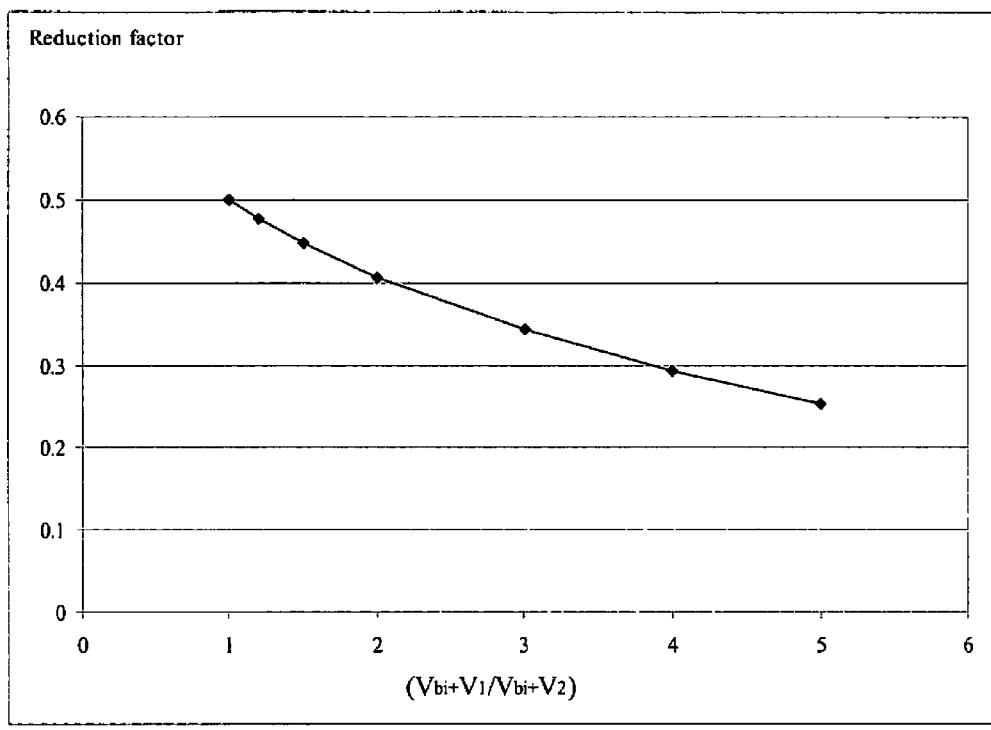
Fig. 5 Reduction factor versus $(V_{bi} + V_1) / (V_{bi} + V_2)$ for $C_2$ using two varactors.

DISPERSION COMPENSATING CIRCUITS FOR OPTICAL TRANSMISSION SYSTEM

FIELD OF THE INVENTION

The present invention relates to optical transmission systems and dispersion compensating circuit associated with optical transmission systems. In particular the present invention relates to delay caused distortion compensating circuits associated with optical transmission systems.

BACKGROUND OF THE INVENTION

Optical transmission systems are widely used to transmit data on a broadband network. In a typical optical transmission system, a laser provides an optical signal at a predetermined frequency which is typically modulated to provide an optical transmission data signal.

In Broadband Passive Optical Network (B-PON) applications, a 1550 nm optical signal is assigned for video signal transmission. An externally modulated laser transmitter is typically used for optical signals because an externally modulated laser transmitter has much lower chirp than a directly modulated laser transmitter. A directly modulated laser transmitter, especially a high power laser transmitter, may have a total laser chirp up to several GHz due to the large laser modulation RF current. The large total laser chirp helps to improve the Stimulated Brillouin Scattering (SBS) suppression optical power level, but when combined with the fiber dispersion, serious second order distortions occur, such as Composite Second Order distortions (CSO).

When the chirped optical frequencies pass through the fiber with dispersion, different frequencies travel through the fiber with different group velocities, which introduces a delay and often causes distortions in the communication signal. CSO distortions often occur in the low −40 dBc range. For the B-PON laser transmitter to be useful, the laser transmitter CSO distortions should be better than −60 dBc. Accordingly, a high degree of CSO correction ability in the high frequencies and very accurate adjustable distortion compensator is needed in order to use a directly modulated laser.

If CSO distortion problem can be solved, a directly modulated laser transmitter has advantages in the B-PON system. In the directly modulated laser transmitter, the OMI is usually at least 1-2 dB higher than the externally modulated laser transmitter. The carry to noise ratio of the B-PON system using directly modulated laser transmitter can be 1-2 dB higher. Using the directly modulated laser transmitter, due to the large laser total chirp, the SBS suppression optical power level can be higher than the SBS threshold suppression optical power level for the externally modulated laser transmitter. This is very useful for B-PON applications. Besides, directly modulated laser transmitters are much cheaper than externally modulated laser transmitter. The reliability and temperature stability of the directly modulated laser transmitters are much better than the externally modulated laser transmitters.

For the B-PON applications, the longest distance is 20 km. So the dispersion compensation for B-PON application needs only to be compensated for up to 20 km fiber distance.

The problem of fiber dispersion compensation has been investigated in great detail and various techniques have been used to solve this problem. The solutions were in both optical domain and electronic domain.

In the optical domain, dispersion compensation fiber (DCF) or chirp fiber Bragg grating (CFBG) can be used for the compensation devices. DCF is an optical fiber that has the exactly the opposite dispersion effect as a regular single mode fiber. A CFBG is a component that reverses the group delay comparing to the ordinary fiber group delay between wavelengths.

The advantage of optical technique is its accuracy. The disadvantages are that the DCF is costly, adds attenuation, and needs additional amplifications and difficult to be readjusted. For the CFBG, the optical attenuation is low. The optical bandwidth is limited to about one nm. It makes the laser source choice more difficult and the laser wavelength needs to be stabilized.

While optical solutions are more expensive, the electronic compensation techniques benefit from being cost effective. In the electronic domain, the prechirp technique has been widely used in digital applications.

One method for the CATV application is described in U.S. Pat. No. 5,115,440 to Hermann Gysel, et al. In this patent, an electrical controlled varactor delay line network is inserted between a source of the laser modulating signal and the laser. The delay line network provides an instant amplitude dependent delay of the modulating signal applied to the laser and compensates the fiber delay caused distortion so that the CSO distortion can be reduced. One of the advantages of using this electrical compensation is that it is not sensitive to the optical wavelength and the compensation can be easily adjusted electronically. This approach worked very well for low optical power (1-3 mw) lasers with relative large laser chirp (1.8 Ghz/ma). However, modern 1550 lasers have much lower laser chirp and may have much large optical power, e.g., laser chirp now may be between 30-70 Mhz/ma and optical power may up to 10-13 dBm.

Large optical power is important for B-PON applications. Large optical output power laser usually has more laser chirp, so the SBS suppression optical power level will be larger. Further, when larger optical power goes to the eridium doped fiber amplifier (EDFA), it increases the carry to noise ratio of the systems.

The large optical power usually needs larger RF drive voltages. For example, for most 1550 laser power range from 10-13 dBm, the peak RF drive voltage will be around 4-8 volts. Comparing to the low optical power lasers, which RF driving voltages are less than one volt. Driving the varactor with large RF voltages, the capacitor change with voltage is nonlinear. Due to the large RF driving voltage, comparing to the prior art, the RF driving voltage needs to be predistorted in order to get linear change capacitor. Also, a very smooth control of dispersion compensation method is needed for CSO correction.

SUMMARY OF THE INVENTION

In accordance with the invention, an apparatus for dispersion compensation in an optical transmission system may comprise: a modulation input configured to receive a modulated signal; a varactor diode network configured to receive a modulation signal from the modulation input, the varactor diode network including a lowpass filter having an inductance and a combined circuit, the combined circuit including a varactor and at least one capacitive element, wherein the varactor diode network provides an amplitude dependent delay of the modulation signal.

In accordance with the invention, the capacitive element may be a capacitor, and the capacitor may have a capacitance approximately the same as the largest capacitance of the varactor under a predetermined RF voltage swing.

In accordance with the invention, the capacitive element may be another varactor, and the capacitance changes in the other varactor may be in an opposite polarity to capacitance changes in the varactor.

In accordance with the invention, the capacitive element may include two additional varactors in parallel with each other.

In accordance with the principles of the invention, an optical transmission system may comprise: a modulation input configured to receive a modulated signal; a varactor diode network configured to receive a modulation signal from the modulation input, the varactor diode network including a lowpass filter having an inductance and a combined circuit, the combined circuit including a varactor and at least one capacitive element, wherein the varactor diode network provides an amplitude dependent delay of the modulation signal.

The present invention offers a compensation method for the nonlinear varactor capacitor change under large RF driving voltage. Thus linearized delay time compensation can be obtained under large RF drive voltage. The compensating delay time can be easily and precisely controlled so that different fiber length can be easily compensated with high degree of accuracy. At high optical output power of 10-13 dBm, for 20 km fiber application, at high frequencies, the CSO improvement can be over 20 dB. The present invention also reduces the total reverse voltage on the varactor so that the varactor reverse voltage breakdown can be avoided even under the large RF drive voltage conditions. The present invention also provides for an improved delay correction circuit for an externally modulated laser transmitter.

BRIEF DESCRIPTION OF THE DRAWINGS

The above and other objects, features and advantages of the present invention will become apparent from the following detailed description of the accompanying drawings, in which:

FIG. 3 is a plot showing the $\delta C_{total}/C_{total}$ reduction factor versus $(V_{bi}-V_2)/(V_{bi}-V_1)$ in the exemplary embodiment of FIG. 2.

FIG. 4 is a third exemplary embodiment of the improved dispersion compensating circuit.

FIG. 5 is a plot showing the $\delta C_{total}/C_{total}$ reduction factor versus $(V_{bi}-V_2)/(V_{bi}-V_1)$ in the exemplary embodiment of FIG. 4.

DETAILED DESCRIPTION

According to the improved method, there is provided a compensation circuit comprising a varactor diode network. The network is preferably inserted between a source of laser modulating signal and the laser. A low pass filter constructs the network. The network preferably includes an inductance and a combined circuit, which includes varactors. The network preferably provides an amplitude dependent delay of the modulating signal applied to the laser.

The capacity of a varactor at any voltage can be expressed by $$C(V)=C_{j0}(1-V/V_{bi})^{-\gamma}=C_{j1}(V_{bi}-V)^{-\gamma} \quad (1)$$

Where $C_{j1}=C_{j0}(V_{bi})^{-\gamma} \quad (2)$

Here C(V) is the varactor capacity at any instant voltage. $C_{j0}$ is the varactor capacity at zero voltage. $\gamma$ is a parameter depending on the varactor doping profile. For example, $\gamma=0.5$ for an abrupt junction, $\gamma=1$ for a hyper-abrupt junction.

The group delay for the delay-compensating network may be given by $$T_{gd}=(L_1*C(V))^{1/2} \quad (3)$$

$$\delta T_{gd}=(1/2)*(\delta C/C)*T_{gd} \quad (4)$$

Here $T_{gd}$ is the varactor network delay time, $L_1$ is the inductance in the delay network, and $\delta T_{gd}$ is the delay time difference used for the dispersion compensation.

Due to the RF signal swing at the varactor, it causes the capacitor of the varactor to change. $\delta C/C$ is the varactor capacitor change due to the RF voltage swing. The dispersion compensation ability is proportional to the varactor capacitor change $\delta C/C$ under the RF voltage swing.

From Equation 1, It can be seen that when the RF voltage swing is large (amplitude 4-8 volts), the capacitor change is nonlinear. Total capacitor change is unequal under the RF voltage positive swing versus negative swing. The fiber dispersion caused signal amplitude delay is equal in amplitude but opposite in sign for the RF positive swing and negative swing. An unequal total capacitor change in the RF swing will cause the delay compensation to be unequal which may cause errors in the compensation. A method of linearization is needed.

Figure 1:
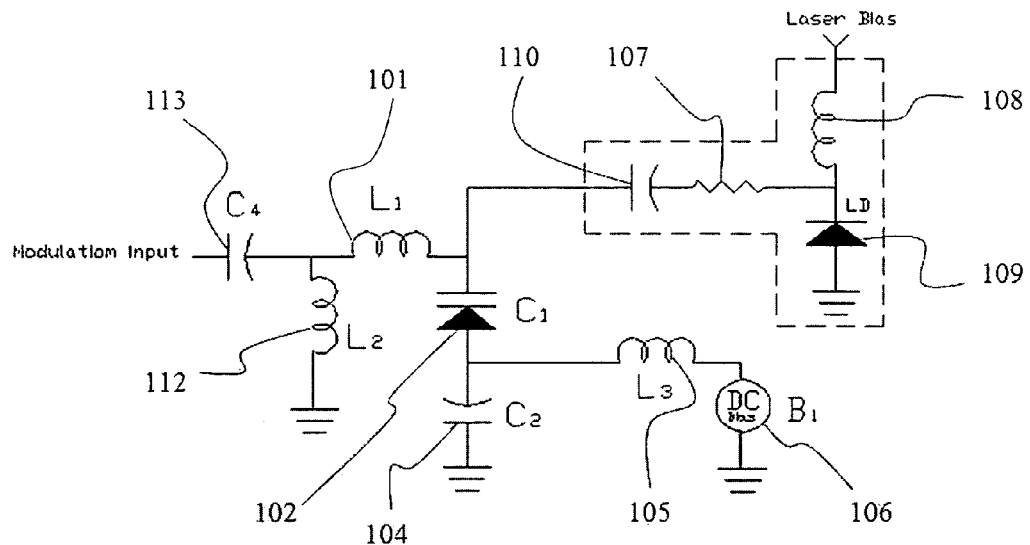
FIG. 1 is a first exemplary embodiment of an improved dispersion compensating circuit.

FIG. 1 is a first exemplary embodiment of an improved dispersion compensating circuit for optical transmission system in accordance with the principles of the invention. As illustrated in FIG. 1, capacitor C 113 is a DC block capacitance and inductor $L_2$ 112 is an RF block inductance used for isolating the DC bias from the RF circuit. The inductance $L_1$ (101) and capacitive structure (including a varactor 102, a capacitor 104, bias circuit 106 and RF isolating inductance 105) forms a lowpass filter. The output of the low pass filter is used to drive the laser 109 through capacitor 110 and resistance 107. The laser is DC biased using a laser bias through RF isolative inductance 108. The value of the fixed capacitor 104 may be selected to be close to the largest capacitive value of the varactor 102 permitted under the RF voltage swing.

The effect of this fixed capacitor 104 can be understood by the following explanations. When the RF voltage swing is in the positive direction, the varactor 102 capacitance becomes smaller and most of the RF voltage is dropped at the varactor. When the RF voltage swings in the negative direction, it makes varactor capacitance larger. When the capacitance of the varactor equals to the fixed capacitor, half of the RF voltage is dropped at the varactor 102. Adjusting the value of the fixed series capacitor 104, the RF voltage reducing on the varactor in the negative RF swing can be adjusted. This procedure makes the total capacitance change equal in both positive voltage swing and negative swing.

Figure 2:
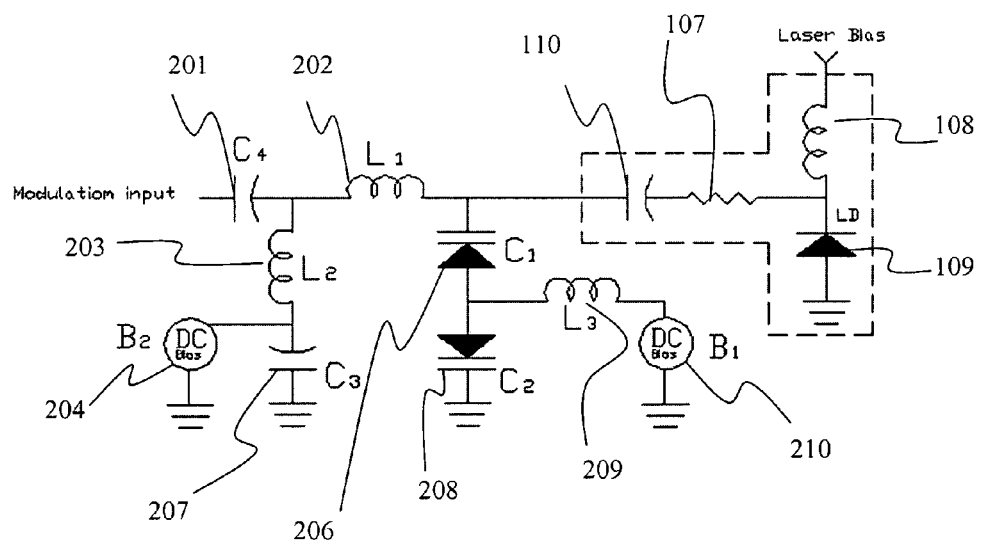
FIG. 2 is a second exemplary embodiment of the improved dispersion compensating circuit.

FIG. 2 illustrates a second exemplary embodiment of the improved dispersion compensating circuit 200 for optical transmission system. In FIG. 2, a modulation input is provided through a lowpass filter arrangement which uses a capacitor 201 in series with inductor 202 ($L_1$), and a capacitor 207 ($C_3$) in series with inductor 203 ($L_3$) and biased with DC bias 204. A second varactor 208 ($C_2$) is in series with varactor 206 ($C_1$) instead of a fixed capacitor as used in the first embodiment. Here $L_1$ 202 is the low pass filter inductance. Varactors $C_1$ 206 and $C_2$ 208 may be identical varactors but biased at different bias voltages. Capacitor $C_3$ 207 and $C_4$ 201 are DC block capacitances. Inductors $L_2$ 203 and $L_3$ 209 are RF block inductances used for isolating the DC bias from the RF circuit. The varactors 206 and 208 are preferably connected such that under the RF voltage swing, the capacitor changes of the varactors are in the different directions.

The varactor 206 is preferably biased more negative than varactor 208. It is easy to do so in FIG. 2 when the bias $B_1$ from DC bias 210 is negative and bias $B_2$ from DC bias 204 is positive. The capacitor value of varactor 206 is less than the capacitor value of varactor 208.

The negative bias voltage on the varactor 206 is $V_1$. The negative bias voltage on the varactor 208 is $V_2$.

Here $$V_1 = B_1 + B_2 \tag{5}$$

$$V_2 = B_1 \tag{6}$$

Here we take the absolute value of bias voltage of $B_1$ and $B_2$.

In FIG. 2, when the RF swings goes to the negative side, it makes the capacitor of varactor 206 larger, the same RF voltage swing also makes the capacitor of varactor 208 smaller. Due to these effects, the RF voltage drop on the varactor 206 will be smaller than in the arrangement illustrated in FIG. 1. The RF voltage reducing in the varactor 206 will be enhanced by the second varactor 208. All of these effects enhance the effect of capacitor change linearization.

Improvements in linearization are also seen in a small signal analysis. In a small signal analysis From Equation 1:

$$C(V) = C_{j1}(V_{bi} - V)^{-\gamma} \tag{7}$$

$$\delta C_1/C_1 = \gamma * \delta V_1/(V_{bi} - V_1) \tag{8}$$

$$\delta C_2/C_2 = \gamma * \delta V_2/(V_{bi} - V_2) \tag{9}$$

$$C_1 = C_{j1}(V_{bi} - V_1)^{-\gamma} \tag{10}$$

$$C_2 = C_{j1}(V_{bi} - V_2)^{-\gamma} \tag{11}$$

There $V_1$, $V_2$ are the DC negative bias voltages on the varactors.

For same type varactors:

$$C_1/C_2 = ((V_{bi} - V_2)/(V_{bi} - V_1))^{\gamma} \tag{12}$$

$$\delta C_1/\delta C_2 = (V_{bi} - V_2)/(V_{bi} - V_1) \tag{13}$$

When the varactors are under the RF driving voltage, the two varactors are in series.

So the total final capacitor for this delay line circuit is:

$$C_{total} = C_1 * C_2/(C_1 + C_2) \tag{14}$$

The same RF current will pass through both varactors. The following condition must hold:

$$\delta V_1 * C_1 = \delta V_2 * C_2 \tag{15}$$

Considering the two varactors are driving by the RF in the different directions, the final total capacity of the series capacitor can be calculated as follows:

$$\delta C_{total}/C_{total} = (1 - ((V_{bi} - V_1)/(V_{bi} - V_2))^{1-\gamma}) * \delta C_1/C_1 \tag{16}$$

$$\delta C_{total}/C_{total} = A * B \tag{17}$$

$$A = \delta C_1/C_1 \tag{18}$$

$$B = 1 - ((V_{bi} - V_1)/(V_{bi} - V_2))^{1-\gamma} \tag{19}$$

Equation 17 shows that in the arrangement illustrated in FIG. 2, two parts A and B compose the change of $\delta C_{total}/C_{total}$. Part A is equal to $\delta C_1/C_1$, which is very close to the original single capacitor change during the RF positive circle, because when RF swing is in the positive circle, most of the RF voltage will be dropped on the varactor 1 (206).

Equations 4, 8, 17, 18, and 19 show that when changing the varactor 1 (206) bias voltage and varactor 2 (208) bias voltages, the dispersion correction ability can be changed according to the bias voltages.

Part B is the $\delta C_{total}/C_{total}$ reducing factor due to the FIG. 2 circuit. $V_{bi}$ is a small value about 0.7V for silicon diodes. $V_1$ and $V_2$ are the negative bias voltage on the varactors. If using absolute value of the bias, Equation 18 can be changed to:

$$B = 1 - ((V_{bi} + V_1)/(V_{bi} + V_2))^{1-\gamma} \tag{20}$$

FIG. 3 shows the $\delta C_{total}/C_{total}$ reduction factor versus $(V_{bi} + V_1)/(V_{bi} + V_2)$. Controlling $V_1/V_2$, it is easy to control the $\delta C_{total}/C_{total}$ reducing factor. In this way, the delay compensation can be controlled smoothly and accurately.

The bias voltage $B_2$ can be adjusted to equal to or less than the RF driving peak voltage. By doing this, the nonlinear capacitor changing with RF voltage can be improved. In the CSO correction adjustment, adjusting $B_1$ to reduce the CSO distortion until the best results are obtained. Fine tuning $B_1$, $B_2$, the best correction can be obtained.

The arrangement illustrated in FIG. 2 is best for small delay distortion compensation, because the correction ability is smallest when $(V_{bi} + V_1)/(V_{bi} + V_2) = 1$ as shows in FIG. 3. That means when $(V_{bi} + V_1)/(V_{bi} + V_2) = 1$, the circuit has zero dispersion correction ability. The dispersion correction ability will change sign when $(V_{bi} + V_1)/(V_{bi} + V_2)$ passes through one.

The arrangement illustrated in FIG. 2 also can be used in the situation of $(V_{bi} + V_1)/(V_{bi} + V_2) < 1$. In this case, $(V_{bi} + V_2)/(V_{bi} + V_1)$ will be larger than one. One may use the arrangement as illustrated in FIG. 3 to find the $\delta C_{total}/C_{total}$ reducing factor. The only thing one has to do is use a minus sign for the $\delta C_{total}/C_{total}$ reducing factor.

The arrangement illustrated in FIG. 2 can be used in the 1550 externally modulated laser transmitter for improving CSO distortion. In this case, the CSO correction needed is relative small.

For 1550 nm externally modulated laser transmitter, the laser chirp is much smaller than the directly modulated laser transmitter. The CSO correction needed is much less than the directly modulated laser transmitter. It can be realized by using the delay correction circuit, it may start correction from zero dispersion and the increase the delay correction ability according to the correction adjustment. It can also be realized by using the first exemplary embodiment of an improved dispersion compensation circuit and by placing the delay correction circuit in front of an RF amplifier, using the RF amplifier output to drive the laser. In this way the CSO correction can also be controlled by the gain of the RF amplifier.

As an example, the values of the components used in the arrangement illustrated in FIG. 2 may be as follows: $C_1 = C_2$ as Toshiba silicon variable capacitance diodes 1SV239; $C_3 = C_4 = 0.1$ µf; $L_1 = 10$ nh; and $L_2 = L_3 = 1$ µh.

FIG. 4 is a third exemplary embodiment of the improved dispersion compensating circuit for optical transmission system using high power directly modulated lasers transmitters. The difference between FIG. 4 and FIG. 2 is that in FIG. 4, two varactors 301 and 302 are used for $C_2$ in parallel instead of using only one varactor in FIG. 2. Varactors 301 and 302 may have the same values.

Using the similar calculation above, the final $\delta C_{total}/C_{total}$ a reducing factor can be express as the follows:

$$\delta C_{total\,2v}/C_{total\,2v} = A_{2v} * B_{2v} \tag{21}$$

$$A_{2v} = \delta C_1/C_1 \tag{22}$$

$$B_{2v} = 1 - \frac{1}{2} * ((V_{bi} - V_1)/(V_{bi} - V_2))^{1-\gamma} \tag{23}$$

The 2V means we are using two varactors for $C_2$.

FIG. 5 shows the $\delta C_{total\ 2v}/C_{total\ 2v}$ reduction factor versus $(V_{bi}+V_1)/(V_{bi}+V_2)$ in the arrangement of FIG. 4 in two varactors situations. As an example, the values of the components used in FIG. 4 may be: $C_1$ as a Toshiba silicon variable capacitance diode 1SV239; $C_2$ as two Toshiba silicon variable capacitance diodes 1SV239 in parallel; $C_3=C_4=0.1$ μf; $L_1=10$ nh; and $L_2=L_3=1$ μh.

It can be seen in FIG. 5, that the correction ability is largest at low varactor bias conditions. FIG. 5 also shows that the dispersion correction abilities can be adjusted very smoothly by changing the varactor two biases.

The arrangement illustrated in FIG. 4 is best for large delay compensation, because the correction ability is highest at the low varactor DC bias condition. The bias voltage $B_2$ can be adjusted much less than the RF driving peak voltage. Because the capacitor $C_2$ uses two varactors, the capacitor values of varactor 1 will keep smaller than the varactor 2 in most of the bias conditions. Adjusting $B_1$, $B_2$, it is very easy to get good correction results. This circuit is best for the directly modulated 1550 laser transmitter.

Those of skill in the art will appreciate that the present invention offers a compensation method for the nonlinear varactor capacitor change under large RF driving voltage. Thus linearized delay time compensation can be obtained under large RF drive voltage. The compensating delay time can be easily and precisely controlled so that different fiber lengths can be easily compensated with a high degree of accuracy. At high optical output power of 10-13 dBm, for a 20 km fiber application, and at high frequencies, the CSO improvement can be over 20 dB. The present invention also reduces the total reverse voltage on the varactor so that the varactor reverse voltage breakdown can be avoided even under the large RF drive voltage conditions. The present invention also provides for an improved delay correction circuit for an externally modulated laser transmitter.

What is claimed is:

1. An apparatus for dispersion compensation in an optical transmission system comprising:
   a modulation input configured to receive a modulated signal;
   a varactor diode network configured to receive a modulation signal from the modulation input, the varactor diode network including a lowpass filter having an inductance and a combined circuit, the combined circuit including a varactor and at least one capacitive element,
   wherein the varactor diode network provides an amplitude dependent delay of the modulation signal, the amplitude dependent delay being a function of $((V_{bi}-V_1)/(V_{bi}-V_2))^{1-\gamma}$ where $V_{bi}$ is a silicon diode junction voltage; $V_1$ and $V_2$ are the negative bias voltages on the varactors of the varactor diode network; and $\gamma$ is a parameter indicative of a varactor doping profile.

2. The apparatus of claim 1, wherein the capacitive element is a capacitor in series with the varactor.

3. The apparatus of claim 2, wherein the capacitor has a capacitance approximately the same as the largest capacitance of the varactor under a predetermined RF voltage swing.

4. The apparatus of claim 1, wherein the capacitive element is another varactor in series with the varactor.

5. The apparatus of claim 4, wherein the another varactor and the varactor are connected to each other with an opposite polarity.

6. The apparatus of claim 1, wherein the capacitive element is in series with the varactor and includes two additional varactors in parallel with each other in opposite polarity with the varactor.

7. An optical transmission system comprising:
   a modulation input configured to receive a modulated signal;
   a varactor diode network configured to receive a modulation signal from the modulation input, the varactor diode network including a lowpass filter having an inductance and a combined circuit, the combined circuit including a varactor and at least one capacitive element,
   wherein the varactor diode network provides an amplitude dependent delay of the modulation signal, the amplitude dependent delay being a function of $((V_{bi}-V_1)/(V_{bi}-V_2))^{1-\gamma}$ where $V_{bi}$ is a silicon diode junction voltage; $V_1$ and $V_2$ are the negative bias voltages on the varactors of the varactor diode network; and $\gamma$ is a parameter indicative of a varactor doping profile.

8. The optical transmission system of claim 7, wherein the capacitive element is a capacitor.

9. The optical transmission system of claim 8, wherein the capacitor has a capacitance approximately the same as the largest capacitance of the varactor under a predetermined RF voltage swing.

10. The optical transmission system of claim 7, wherein the capacitive element is another varactor.

11. The optical transmission system of claim 10, wherein capacitance changes in the other varactor are in an opposite polarity to capacitance changes in the varactor.

12. The optical transmission system of claim 7, wherein the capacitive element includes two additional varactors in parallel with each other.

* * * * *